INVENTORS
Herbert W. Lensner &
Harold G. Farley
BY
ATTORNEY

United States Patent Office 3,114,140
Patented Dec. 10, 1963

3,114,140
PILOT-WIRE SYSTEMS
Herbert W. Lensner, East Orange, and Harold G. Farley, Hoboken, N.J., assignors to Westinghouse Electric Corporation, East Pittsburgh, Pa., a corporation of Pennsylvania
Filed Sept. 6, 1960, Ser. No. 54,100
10 Claims. (Cl. 340—213)

This invention relates to monitor and supervisory circuits for pilot-wire systems, and it has particular relation to pilot-wire systems which are utilized for the purpose of transmitting alternating currents between the two ends of an alternating-current transmission-line section which is being protected against faults occurring within the protected section.

An example of prior-art pilot-wire systems having monitor circuits is found in the Bostwick et al. Patent 2,318,364. Such circuits formerly were known as supervisory circuits, but the present practice is to designate that function of the system which checks the condition of the pilot-wire system as a monitoring function.

In accordance with the invention, a pilot-wire system is provided with monitoring equipment capable of detecting the presence of an open circuit, a short circuit, a ground or a reversal of the pilot-wire conductors. In addition, supervisory or remote control equipment is provided for supervising or remote control of apparatus through the pilot-wire circuit without affecting the calibration of the monitoring equipment. The supervising or remote control equipment preferably operates independently of the monitoring equipment. The monitoring equipment preferably does not respond to induced voltages in the pilot-wire circuit or to variation in station ground potentials.

It is, therefore, an object of the invention to provide an improved pilot-wire system having monitoring and supervisory or remote control equipment wherein the operation of the supervisory or remote control equipment does not affect the calibration of the monitoring equipment.

It is a further object of the invention to provide a pilot-wire system with means for transmitting a direct current in a first direction through a pilot-wire circuit for performing a first function and means for transmitting a direct current in a second direction through the pilot-wire circuit for performing a second function.

It is also an object of the invention to provide a pilot-wire system as set forth in the immediately preceding paragraph, together with separate means each responsive to only one of the direct currents.

It is another object of the invention to provide a ground-fault protection device for a pilot-wire system which responds only to ground faults occurring on a predetermined portion of the system.

Figure 1:
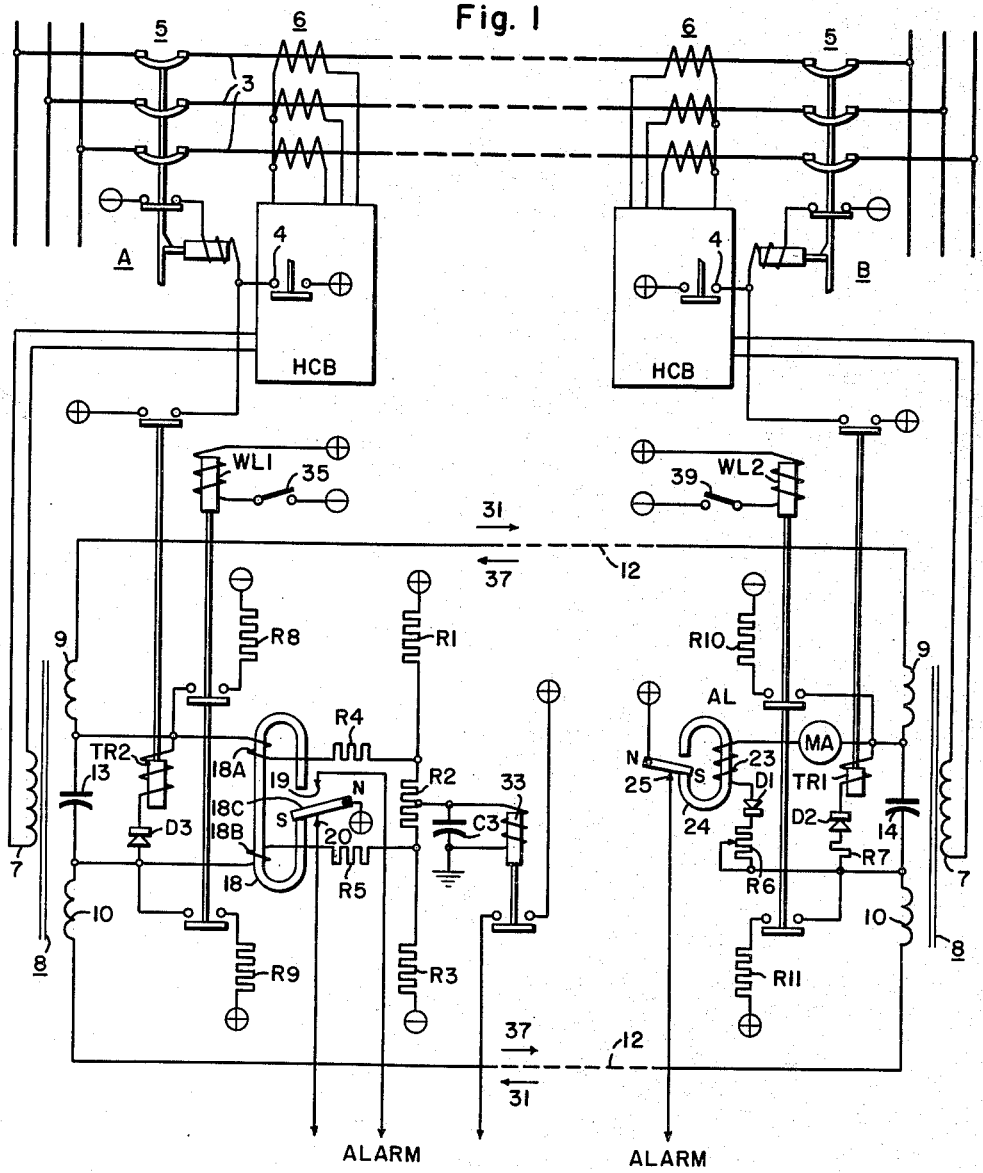
Figure 2:
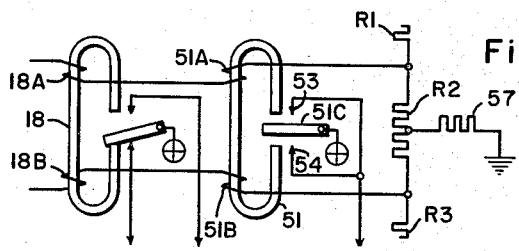

Other objects will be apparent from the following description taken in conjunction with the accompanying drawing wherein FIG. 1 shows in diagrammatic form a pilot-wire system associated with a polyphase alternating-current line section; and, FIG. 2 shows in diagrammatic form a modified form of a pilot-wire system embodying the invention.

In the drawing, a three-phase transmission line section 3 extending between stations A and B is provided with current-comparing pilot-wire relay protection. The particular system which is illustrated utilizes a line-fault-responsive phase-sequence relaying-apparatus HCB at each end of the protected line section 3, said apparatus including relay-contacts 4 for energizing the trip-circuit of a circuit breaker 5 at that end of the protected line-section. The phase-sequence relaying-apparatus HCB may be of any suitable type for deriving a single-phase electrical quantity, either a voltage or current, which is responsive to the polyphase line-currents as supplied by line-current transformers 6, a suitable relaying apparatus for this purpose being shown in the Harder Patent No. 2,183,646, granted December 19, 1939.

The line-protecting relays HCB, besides being coupled to the line-current transformers 6, are also coupled to the respective primary windings 7 of two insulating transformers 8 having split secondary windings 9 and 10. The outer terminals of the split secondary windings 9 and 10 at the respective ends of the protected line-section are joined by a two-conductor pilot-wire circuit 12 to which the present invention is particularly directed, and the line-frequency currents are circulated in the pilot-wire circuit 12 through circuit-completing capacitors 13 and 14 which are utilized to join the inner ends of the respective split secondary windings 9 and 10 at the two ends of the pilot-wire circuit, respectively. The pilot-wire circuit 12 serves as a means for circulating and totalizing or comparing the line-frequency currents derived from the phase-sequence line-current responsive apparatus HCB at the two ends of the protected line section, so that the HCB relay-contacts 4 serve as means for protecting the line-section against faults therein.

The pilot-wire circuit 12 is monitored by connecting a suitable source of direct current across the terminals of the capacitor 13 at one end of the pilot-wire circuit for circulating direct current through the pilot-wire circuit. The direct current also passes through two aiding windings of a sensitive polarized relay 18 which has a front-contact 19 and a back-contact 20. The front-contact 19 is a contact which is spaced from the movable contact 18C and thus is normally open when the relay is deenergized. The back-contact 20 is a contact which engages the movable contact 18C and this is normally closed when the relay is deenergized. The relay 18 is so chosen that, during normal pilot-wire conditions, the circulating monitoring direct current is of sufficient magnitude to operate the movable contact to a position keeping the back-contact 20 open, without closing the front-contact 19 so that the relay will respond, either to an overcurrent produced by a short circuit or a ground fault on the pilot-wire circuit 12 or to an undercurrent caused by an open-circuiting or breakage of the pilot-wire circuit, in either event closing an alarm circuit as indicated.

At the receiving end of the pilot-wire circuit 12, the direct-current voltage across the capacitor 14 is utilized to energize the operating coil 23 of an undercurrent relay 24, having a back-contact 25 which energizes an alarm circuit in response to an abnormal reduction in the circulated monitoring direct current such as will occur whenever the pilot wire 12 is short-circuited, open-circuited or grounded.

The components of the drawing which thus far have been specifically designated are similar to components bearing the same reference characters in the aforesaid Bostwick et al. patent.

As previously pointed out, a suitable source of direct current is applied across the terminals of the capacitor 13. In the specific embodiment of the drawing, the source of direct current is represented by a voltage divider having resistors R1, R2 and R3 connected in series across a source of direct current represented by polarity markings + and —. As viewed in the drawing, the upper terminal of the resistor R2 is connected to the upper terminal of the capacitor 13 through a resistor R4 and an energizing winding 18A of the relay 18. The lower terminal of the resistor R2 is connected to the lower terminal of the capacitor 13 through a resistor R5 and an energizing winding 18B of the relay 18. Thus, the voltage drop across the resistor R2 directs the circulating monitoring current represented by the arrows 31 through the pilot-wire circuit. The currents flowing through the energizing windings 18A and 18B produce aiding magnetomotive forces in the relay having a magnitude normally sufficient to actuate the movable-contact 18C to a position midway between the front-contact 19 and the back-contact 20. An increase or decrease in the circulating current results in engagement of one of the contacts 19 and 20 by the movable-contact 18C to complete an energizing circuit for a suitable signal or alarm.

By inspection of the drawing, it will be noted that a resistor R2 has a center tap which is connected to ground through the energizing winding of a ground relay 33. The energizing winding is shunted by a capacitor C3 to make the relay 33 substantially immune to voltages induced in the pilot-wire circuit. If either conductor of the pilot-wire circuit is grounded, a current flows through the energizing winding of the relay 33 to pick up the relay and complete an energizing circuit for an alarm or other suitable signal.

Provision is made for directing current in a reverse direction through the pilot-wire circuit. To this end, a relay WL1 is provided which is energized through a switch 35. This switch may be operated manually or it may be operated automatically in any desired manner when a remote or supervisory operation is desired at the receiving end of the system. When the relay WL1 is energized, it connects the capacitor 13 in series with the resistors R8 and R9 across a suitable source of direct current represented by polarity markings + and —. Under these circumstances, direct current flows through the pilot-wire circuit in the direction represented by the arrows 37. This source of direct current also transmits a current through a circuit which extends through the winding 18B, the resistors R5, R2 and R4, and the winding 18A. The magnitude of this current is limited by the resistors. It should be noted that current flows through the windings 18B and 18A always in the same direction. This is desirable in order to prevent errors in calibration due to residual magnetism.

If the receiver-end relay 24 is a directionally-responsive polarized relay, the reverse current represented by the arrows 37 would be incapable of picking up the relay. However, it is desirable to block this current from the energizing winding of the relay in order to prevent changes in calibration of the relay due to effects of residual magnetism. For this reason, the energizing winding of the relay 24 is connected across the capacitor 14 through a rectifier D1 and an adjustable resistor R6. The rectifier D1 effectually blocks the reverse current from the energizing winding of the relay 24.

The reverse current represented by the arrows 37 may be employed for any desired control operation at the receiving end. In the specific embodiment illustrated, a tripping relay TR1 is provided which when energized and picked up trips the circuit breaker 5 at station B. This relay has its energizing winding connected across the capacitor 14 through a rectifier D2 and a resistor R7. This rectifier is so poled that it blocks currents having a direction represented by the arrows 31 but transmits currents having the direction represented by the arrows 37. Consequently, the relay discriminates properly between the monitoring and remote control or supervisory currents.

If the pilot wires are reversed between the stations A and B, a current flowing through the pilot-wire circuit which is represented by the arrows 31 now will pass through the rectifier D2 and the resistor R7. Inasmuch as this current does not now pass through the energizing winding of the relay 24, this relay drops out to sound an alarm. In addition, the resistors R6 and R7 are different in magnitude. For this reason, the monitoring current which now flows through the resistor R7 has a magnitude deviating from its normal magnitude and the relay 18 consequently operates to sound an alarm at the transmitting end of the pilot-wire circuit. However, this current which now flows through the tripping relay TR1 is not high enough to cause this relay to operate.

In order to perform a remote operation at the station A from the station B, a relay WL2 is provided at station B which is energized by operation of a switch 39. The switch 39 may be manually operated or it may operate automatically in response to some desired condition. When the relay WL2 picks up, it connects the capacitor 14 in series with resistors R10 and R11 across a source of direct current represented by polarity markings + and —. A resultant current through the pilot-wire circuit is employed for operating a suitable device such as a tripping relay TR2 at the station A. The tripping relay TR2 may be employed when picked up to trip the circuit breaker 5 at the station A. It will be noted that the energizing windings of the relay TR2 is connected across the capacitor 13 through a rectifier D3. This rectifier is so poled that current produced by pickup of the relay WL2 flows through the rectifier D3 to pick up the tripping relay TR2. It should be noted that this flow of current does not alter the direction of current through the windings 18B and 18A. Consequently, no problem of change in calibration of the relay due to residual magnetism is introduced.

Various operations of the system illustrated in the drawing now will be reviewed. It will be assumed that the protected line-section 3 is connected by its circuit breakers 5 to the associated buses. If a fault occurs on the protected line-section at some point between the circuit breakers, the relays HCB operate in a manner well understood in the art to trip the circuit breakers 5 for the purpose of clearing the fault.

While the system is in normal operation, a monitoring direct current is continuously supplied through the resistors R1 and R3 in the direction of the arrows 31. This current may have a magnitude of the order of 1 milliampere. Such a current operates the movable-contact 18C of the relay 18 to a floating or mid-position which is between the two fixed contacts 19 and 20. Also, the current is sufficient for the relay 24 to maintain its contacts in an open condition. Under these circumstances, no alarm is sounded. The value of the current flowing in the circuit may be shown by a suitable milliameter MA.

Let it be assumed next that a short circuit occurs between the conductors of the pilot-wire circuit. As a result of the short circuit, an increased current flows through the energizing windings of the relay 18, and the movable-contact 18C of this relay engages the associated fixed contact 19 to sound an alarm at the station A. In addition, the short circuit decreases the current supplied to the relay 24 and this relay consequently drops out to sound an alarm at the station B.

With the system in its normal operating condition, let it be assumed that a ground fault occurs on the upper conductor of the pilot wire circuit as viewed in the drawing. Under these circumstances, a current flows through the energizing winding of the relay 33 in one direction to pick up the relay and thus to sound an alarm. Should the ground fault occur on the lower conductor of the pilot-wire circuit, a current would flow in the reverse direction through the energizing winding of the relay 33 and thus would pick up the relay to sound the alarm. The relay 33 thus responds to either direction of current flow therethrough.

If the conductors of the pilot-wire circuit are inadvertently connected in reverse to the secondary windings 9 and 10 associated with the capacitor 14, the rectifier D1 would block the flow of monitoring current through the energizing winding of the relay 24. Consequently, this relay would drop out to sound the alarm at the station B. The monitoring current now would flow through the rectifier D2. However, the monitoring current has a magnitude which is too low to pick up the tripping relay TR1. Under these circumstances, the monitoring current has a magnitude which differs from its normal magnitude. This is for the reason that the resistors R6 and R7 have different resistances. Because of the differences in the magnitude of the monitoring current, the relay 18 operates to sound its associated alarm. Thus an alarm is sounded at each station in the event that the pilot-wire circuit has its conductors improperly connected.

With the system in its normal operating condition, let it be assumed that the switch 35 is operated to initiate a remote control operation at the station B. As a result of the operation of the switch 35, the relay WL1 picks up to connect the capacitor 13 through the resistors R8 and R9 across the associated source of direct current. This source transmits current in the direction of the arrows 37 through the pilot-wire circuit. Because of its direction, this current is blocked by the rectifier D1 and cannot change the calibration of the relay 24 by residual magnetization thereof. However, the rectifier D2 permits the flow of this current through the tripping relay TR1 and the relay picks up to trip the circuit breaker 5 at station B. The magnitude of the current supplied to the energizing winding of the tripping relay TR1 may be of the order of 5 milliamperes. It will be noted that the operation of the switch 35 also supplies current to the tripping relay TR2. However, this is immaterial for the reason that the remote tripping operation is desired only if the protected relays have operated to trip the circuit breaker 5 at the station A. As previously explained, current flowing through the resistors R8 and R9 also is supplied to the windings 18A and 18B of the relay 18. However, the direction of energization of the relay 18 is unchanged and the resistors R4 and R5 limit the magnitude of this current. Under these circumstances, the calibration of the relay 18 is not changed by residual magnetization.

Let it be assumed next that with the system in normal operating condition, the switch 39 is closed to pick up the relay WL2. This connects the capacitor 14 through the resistors R10 and R11 to a source of direct current which directs a current in the direction of the arrows 31 through the pilot-wire circuit. The current passes through the rectifier D3 and picks up the tripping relay TR2 to trip the circuit breaker 5 at the station A. The tripping relay TR1 also picks up under these circumstances. This is not objectionable for the reason that the remote control operation is desired only when the protective relays have operated to trip the circuit breaker 5 at the station B. This operation also transmits current through the energizing windings 18A and 18B of the relay 18. However, the direction of energization of the windings is unchanged and the magnitude of the energization is limited by the resistors R4 and R5. For this reason, the calibration of the relay 18 is not changed by the effects of residual magnetization.

In FIG. 1, the relay 33 responds to ground faults occurring on the source of direct current represented by the voltage dividers R1, R2 and R3. In a preferred embodiment of the invention the relay 33 is replaced by a ground relay 51 which may be a sensitive polarized relay having two windings 51A and 51B which replace respectively the resistors R4 and R5 of FIG. 1. These windings are differentially arranged so that the normal monitoring current produces zero resultant ampere turns in the windings. Under this normal condition the movable contact 51C of the relay is biased betwen and spaced from two fixed contacts 53 and 54. The center tap of the resistor R2 in FIG. 2 is connected to ground through a resistor 57.

When a ground occurs on a pilot wire conductor a difference exists in the ampere turns of the windings 51A and 51B. This difference operates the movable contact 51C into engagement with one of the fixed contacts 53 or 54 to operate a signal or an alarm. A ground on the source of direct current represented by the voltage dividers R1, R2 and R3 does not operate the relay 51.

Although the invention has been described with reference to certain specific embodiments thereof, numerous modifications falling within the spirit and scope of the invention are possible.

We claim as our invention:

1. In combination, a protected alternating-current line-section, a pilot-wire circuit comprising two conductors extending in the direction of said line-section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, means for passing a first direct current in a first direction through said two conductors in series, means selectively operable adjacent the first line-section control means for passing a second direct current in a second direction through said two conductors in series, a first control unit substantially insensitive to said alternating quantity and responsive only to the first of said two direct currents, and a second control unit substantially insensitive to said alternating quantity and adjacent the second line-section control means responsive only to the second of said two direct currents.

2. In combination, a protected alternating-current line-section, a pilot-wire circuit comprising two conductors extending in the direction of said line-section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, means for passing a first direct current in a first direction through said two conductors in series, means selectively operable adjacent the first line-section control means for passing a second direct current in a second direction through said two conductors in series, a first control unit substantially insensitive to said alternating quantity and responsive only to the first of said two direct currents, and a second control unit substantially insensitive to said alternating quantity and adjacent the second line-section control means responsive only to the second of said two direct currents, and a third control unit adjacent the first line-section control means and responsive to the magnitude of direct current flowing through the pilot-wire circuit, said first and second control units offering different resistances to the flow of direct current therethrough.

3. In combination, a protected alternating-current line-section, a pilot-wire circuit comprising two conductors extending in the direction of said line-section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, means for passing a first direct current in a first direction through said two conductors in series, means selectively operable adjacent the first line-section control means for passing a second direct current in a second direction through said two conductors in series, a first control unit responsive only to the first of said two direct currents, and a second control unit substantially insensitive to said alternating quantity and adjacent the second line-section control means responsive only to the second of said two direct currents, said second control unit substantially insensitive to said alternating quantity and comprising a polarized electromagnetic relay having an energizing winding and a rectifier associated with said winding for limiting current through said winding to the direction of the second of said two direct currents.

4. In combination, a protected alternating-current line-section, a pilot-wire circuit comprising two conductors extending in the direction of said line-section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, means for passing a first direct current in a first direction through said two conductors in series, means selectively operable adjacent the first line-section control means for passing a second direct current in a second direction through said two conductors in series, a first control unit substantially insensitive to said alternating quantity and responsive only to the first of said two direct currents, and a second control unit substantially insensitive to said alternating quantity and adjacent the second line-section control means responsive only to the second of said two direct currents, and a third control unit adjacent the first line-section control means and responsive to the magnitude of direct current flowing through the pilot-wire circuit, said first and second control units offering different resistances to the flow of direct current therethrough, said third control unit having a deenergized control condition, a first energized control condition when energized by a direct current of at least a predetermined magnitude and an intermediate non-control condition when energized by a substantial direct current of less than said predetermined magnitude, said first-named control unit having a deenergized control condition and being operated away from said control condition in response to the last-named direct current.

5. In combination, a protected alternating-current line-section, a pilot-wire circuit comprising two conductors extending in the direction of said line section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, means for passing a first direct current in a first direction through said two conductors in series, means selectively operable adjacent the first line-section control means for passing a second direct current in a second direction through said two conductors in series, a first control unit substantially insensitive to said alternating quantity and responsive only to the first of said two direct currents, and a second control unit substantially insensitive to said alternating quantity and adjacent the second line-section control means responsive only to the second of said two direct currents, a third control unit responsive to direct voltage, and means for connecting the third control unit for energization by the voltage between ground and a point on said pilot-wire circuit having an electric potential intermediate the electric potentials of said conductors.

6. In combination, a protected alternating-current line-section having first and second ends, a first circuit breaker for connecting the first end of the line-section to an external circuit, a second circuit breaker for connecting the second end of the line-section to an external circuit, a pilot-wire circuit comprising two conductors extending in the direction of said line-section, first and second control means respectively adjacent said first and second ends for controlling respectively the tripping of the first and second circuit breakers, said control means requiring a coupling for transmitting alternating currents therebetween, first transformer means for coupling a first end of the pilot-wire circuit to the first control means, a center-tapped resistor, said transformer means having first and second secondary windings connected in series with said resistor across the adjacent ends of said conductors, second transformer means for coupling a second end of the pilot-wire circuit to the second control means, means operable for directing direct current in each of two directions through said pilot-wire circuit, a first control unit substantially insensitive to said alternating quantity and responsive to only one direction of flow of direct current, said second transformer means having first and second secondary windings connected in series with the control unit input in a second circuit across the adjacent ends of the conductors, a second control unit substantially insensitive to said alternating quantity and responsive to only one direction of flow of direct current, said second control unit being connected in said second circuit for response to a direct current having a direction opposite to that to which the first control unit responds, and a direct-voltage responsive control unit connected between said center tap and ground.

7. In combination, a protected alternating-current line-section having first and second ends, a first circuit breaker for connecting the first end of the line-section to an external circuit, a second circuit breaker for connecting the second end of the line-section to an external circuit, a pilot-wire circuit comprising two conductors extending in the direction of said line section, first and second control means respectively adjacent said first and second ends for controlling respectively the tripping of the first and second circuit breakers, said control means requiring a coupling for transmitting alternating current therebetween, first transformer means for coupling a first end of the pilot-wire circuit to the first control means, a center-tapped resistor, said transformer means having first and second secondary windings connected in series with said resistor across the adjacent ends of said conductors, second transformer means for coupling a second end of the pilot-wire circuit to the second control means, means operable for directing direct current in each of two directions through said pilot-wire circuit, a first control unit substantially insensitive to said alternating quantity and responsive to only one direction of flow of direct current, said second transformer means having first and second secondary windings connected in series with the control unit input in a second circuit across the adjacent ends of the conductors, a second control unit substantially insensitive to said alternating quantity and responsive to only one direction of flow of direct current, said second control unit being connected in said second circuit for response to a direct current having a direction opposite to that to which the first control unit responds, and a direct-voltage responsive control unit connected between said center tap and ground, a third control unit adjacent the first control means and responsive to current flowing in the pilot-wire circuit, means for applying a voltage across said resistor to direct current in a first direction through the pilot-wire circuit and the third control unit, and means selectively operable adjacent the first control means for reversing the direction of current flow in the pilot-wire circuit while continuing the flow of current through the third control unit in said first direction.

8. In combination, a protected alternating-current line-section, a pilot-wire circuit comprising two conductors extending in the direction of said line-section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, a first direct-current responsive control means adjacent the first line-section control means, means for passing a first direct current through said first control means in a first direction and through the two conductors in series in a first direction, means selectively operable for passing a second direct current through the two conductors in series in a second direction while continuing the flow of direct current through the control means in the first direction, a second control unit substantially insensitive to said alternating quantity and adjacent the second line-section control means and responsive only to the first of said two direct currents flowing in the two conductors, and a third control unit adjacent the second line-section control means and responsive only to the second of said two direct currents flowing in the two conductors.

9. In combination, a protected alternating-current line-section, a pilot-wire circuit comprising two conductors extending in the direction of said line-section, first and second line-section control means disposed respectively at each end of the line-section, said control means being dependent on an alternating quantity to be transmitted therebetween, first and second coupling means respectively coupling the first and second line-section control means to the pilot-wire circuit to transmit an alternating quantity while providing direct-current isolation between the pilot-wire circuit and each of the control means, means for passing a direct current through said two conductors in series, and translating means substantially insensitive to said alternating quantity and responsive to the difference between direct currents flowing through said conductors.

10. In combination, a protected alternating-current line-section extending between first and second stations, a pilot-wire circuit comprising two conductors extending in the direction of said line-section, first and second line-section control means disposed respectively at each end of the line-section, said control means being dependent on an alternating quantity to be transmitted therebetween, direct-current-conductor means connecting the two conductors in series adjacent the first station, first and second coupling means respectively coupling the first and second line-section control means to the pilot-wire circuit to transmit an alternating quantity while providing direct-current isolation between the pilot-wire circuit and each of the control means, source means adjacent the second station for passing a first direct current in a first direction through said two conductors in series, said source means having two terminals for applying a direct voltage across said conductors and a center tap having a potential intermediate the potentials of the terminals, means grounding the center tap, and translating means substantially insensitive to said alternating quantity and responsive to the difference between the magnitudes of direct currents passing through the two conductors as measured at points between said terminals and the conductors.

References Cited in the file of this patent

UNITED STATES PATENTS

| | | |
|---|---|---|
| 1,979,101 | Dudley | Oct. 30, 1934 |
| 2,197,868 | Knowlton | Apr. 23, 1940 |
| 2,736,882 | Sorensen | Feb. 28, 1956 |
| 2,840,802 | Derr | June 24, 1958 |
| 2,874,337 | Sorensen | Feb. 17, 1959 |

FOREIGN PATENTS

| | | |
|---|---|---|
| 902,877 | Germany | Jan. 28, 1954 |